Oct. 17, 1967           P. F. MORGAN           3,347,537

APPARATUS FOR AERATING LIQUID MEDIUMS

Filed Sept. 27, 1965

INVENTOR
PHILIP F. MORGAN
by      deceased
OLIVE E. MORGAN
MRS. JOHN WICKS
PAUL F. MORGAN
HEIRS

United States Patent Office 3,347,537
Patented Oct. 17, 1967

3,347,537
APPARATUS FOR AERATING LIQUID MEDIUMS
Philip F. Morgan, deceased, late of Iowa City, Iowa, by Olive E. Morgan, Iowa City, Iowa, Mrs. John Wicks, nee Nedra A. Morgan, Fort Lee, Va., and Paul F. Morgan, Chicago, Ill., heirs, assignors to FMC Corporation, San Jose, Calif., a corporation of Delaware
Filed Sept. 27, 1965, Ser. No. 491,076
9 Claims. (Cl. 261—124)

This application is a continuation-in-part of application Ser. No. 136,394, filed Aug. 29, 1961, entitled, Method of Aerating Liquid Mediums, now Patent No. 3,232,866.

This invention relates to the contacting of gases with liquid mediums. More particularly, it relates to apparatus for the treatment of sewage and industrial wastes.

In accordance with the present invention, liquid mediums are treated by passage of multicomponent gas containing a component separable therefrom during the passage of the gas through said liquid medium. The gas is dispersed in the liquid medium in the form of bubbles by means of diffusers spaced in critical relative positioning within the holder for said liquid mediums whereby a markedly increased efficiency of absorption of the desired component is attained.

The advantages of this system, for aeration purposes, are that the efficiency of oxygen absorption at high air throughput rates is of the same order of magnitude as the efficiency obtained at uneconomically low air throughput rates in spiral flow tanks currently available. This novel apparatus arrangement maintains the oxygen absorption efficiency at or close to the oxygen absorption efficiency attained formerly only at relatively low but uneconomical air throughput rates, over a wide range of inputs, measured as c.f.m. per foot of tank length.

The oxygen absorption efficiency in commercially available spiral flow tanks falls quickly as the air throughput is increased, and cannot be raised by increasing the throughput of air.

Oxygen absorption efficiency as used herein, is determined as the percentage ratio of the amount of oxygen absorbed by clear tap water, at zero dissolved oxygen and 20° C., to the amount of oxygen available in the air passed through the water.

In obtaining a sample for titration or electrical measurement to determine the dissolved oxygen, care is required to obtain a composite representative of the whole tank. Generally, oxygen is determined in a sample which is a composite of samples obtained at a multiplicity of spaced points.

Briefly, the present invention deals with aerating liquid in apparatus comprising a suitable holding zone wherein a multiplicity of gas diffusers are positioned at a point elevated from the floor of the holding zone and across the width of the holding zone and extend over all or any part of the length of the holding zone to provide substantially parallel rows of gas diffusers, the operation of which creates regions of contact and turbulence therebetween.

When, for example, air is introduced into an aqueous medium, the air and liquid dispersion rises. Liquid carried upwards is replaced by liquid flowing downwardly and/or laterally into the region vacated by the dispersion. When aeration is continuous, the liquid flow develops well defined flow patterns. If the air is introduced at spaced points, the dispersions rise from the vicinity of each gas inlet in companion bands of aeration. Dispersions of air in liquid may contact as they rise through mediums or may tend to break into downwardly flowing streams before contact. In either instance, when adjacent portions of two companion bands of aeration meet, the contacting and mixing is creative of turbulence. The distance between a band of aeration and an adjacent wall and the width of said areas of contact between opposed portions of companion bands of aeration bear a critical relationship to the effective width of the companion bands of aeration if high oxygen absorption is to be maintained.

The high rate of oxygen absorption accomplished by the apparatus of this invention makes it attractive for use in the aeration and purification of water, in the treatment of sewage, for example, by the activated sludge process, by the step aeration process, by high rate aeration processes, etc., in lagoons, in flowing stream, and the like, as well as in the flotation of ore, in fermentation processes, and the like. The apparatus can be used to improve the aeration capacity of existing plants, and to attain high capacity in new plants with a low capital investment.

Users of prior processes have been confronted with the problem of how to increase the oxygenation efficiency of diffused air systems, i.e., the problem of achieving greater oxygen absorption from the air passed through a liquid. Sewage treatment and the modification of the aeration systems over the years is typical of the adaptation of processes and apparatus in the continuing search for improved oxygen absorption.

Diffused air is used, for example, in the treatment of sewage, to supply oxygen in quantities satisfying the biochemical oxygen demand and for thorough mixing and circulation of the tank contents. The diffuser efficiency is a measure of the transfer rate of the oxygen from the air into the liquid. Coarse bubble nozzle diffusers, such as spargers, have a reported diffuser efficiency of between 6 and 6.5%. Porous media, i.e., fine bubble diffusers, consisting of a single row of 24 inch diffusers mounted on one side of a header and positioned along one side of a tank adapted for so-called "spiral flow" operation, provide conditions resulting in a diffuser efficiency of the order of 14% to 12% at flow rates per foot of tank length in the range of 2 to 5 c.f.m. per foot and lower efficiency of the order of 10% to 9% at flow rates of 10 to 20 c.f.m. per foot. At air throughputs above 20 c.f.m., the efficiency of oxygen absorption approaches asymptotically to a minimum efficiency of the order of about 8% to 9%.

"Shear box" diffusers do not exhibit as high an efficiency at low rates of air throughput as the fine bubble diffusers, but maintain a more uniform efficiency over a wider range of air throughput per foot of tank length than a single row of porous media diffuser. The efficiency of "shear box" diffusers generally falls intermediate that shown for porous media diffusers and coarse bubble diffusers such as spargers. Efficiencies of diffusers are subject to appreciable variation with change in the depth of diffuser submergence in the liquid.

In an attempt to achieve greater oxygen absorption, sewage treatment plants in various countries have been built having a multiplicity of air dispersers in a tank. One form of such arrangement is known as the "transverse ridge and furrow" system. Sewage installations have also been made in which three rows of porous diffuser plates run the length of the aeration tank. These longitudinal "ridge and furrow" systems all have ceramic diffuser plates positioned in the floor of the tank and are operated with a gas input of about 5 c.f.m. per foot of tank length and are incapable, by reason of diffuser capacities and spacing, of operating in accordance with the method hereinafter described.

Recent sewage aeration practice generally has favored a diffused air system of aeration where a row of diffusers is positioned along one side of a sewage treatment tank to create "spiral flow" in aeration tanks because of reduced air requirements and relatively low cost, both of construction and operation. The "spiral flow" tanks utilized in the standard activated sludge process generally operate with air input of from 3 to 12 c.f.m. per diffuser.

Modifications of the activated sludge process, such as "step aeration," have operated at an input of 5 to 15 c.f.m. per foot of tank length and the high B.O.D. short period aeration processes involving high B.O.D. loading rates have operated with air inputs of 15 to 50 c.f.m. per foot of tank length.

In all of these processes wherein "spiral flow" is involved, oxygenation capacity could not be increased because greater quantities of air could not be introduced due to the limitations of the aeration equipment available to introduce the air. When larger quantities of air than those discussed previously were desired, the water treating and sewage treatment industries have resorted to devices whereby air is introduced into the liquid through relatively large nozzles and shearing forces are created by mechanically operated propellers.

Now it has been discovered that gas may be introduced into aqueous media in quantities not heretofore deemed feasible in diffusion systems, to accomplish, for example, oxygenation at a high oxygen absorption efficiency attainable heretofore in diffusion system only at low, economically unfeasible air input rates. It is a further surprising discovery that the high oxygen absorption efficiency is maintained substantially undiminished over a wide range of air input rates whereas in prior systems when the air input was increased to economically feasible rates, the absorption efficiency diminished appreciably from that attained at the economically unfeasible input rates.

The method of operation whereby the high oxygen absorption efficiencies are obtained requires the introduction of air in a diffused state into the aqueous media in a plurality of areas causing liquid and air to rise and to create a multiplicity of spaced longitudinally extending bands of aeration within said body of liquid which are spaced from the walls and from one another a distance falling within hereinafter discussed critical ranges.

For the purposes of this invention, a band of aeration is defined as the vertical projection of an area bounded laterally by a line drawn through the extremities of the diffusion areas which fall in an elongated path and from which gas introduction is initiated. Such diffusion areas may consist of a single diffuser or a multiplicity of diffusers. A gas-liquid dispersion rising from the point of air introduction may appear in a vertical elevational view as an inverted cone or a truncated cone depending upon the distance in side elevational view over which gas is introduced into the liquid medium. Discussion relative to the effective lateral dimension of a band of aeration is based upon its width at the point of introduction of gas in a projection against the end wall or a plane taken in an elevational view and looking in the direction of the elongated path.

It has been discovered that a new and unexpected level of oxygen absorption efficiency is obtainable if a multiplicity of rows of gas diffusers are positioned within a liquid medium so as to create bands of aeration such that the distance between the perimeter lines of adjacent bands of aeration is between approximately 40% and 150% of the sum of the widths of said adjacent bands. Spacing of the rows of diffusers in accordance with this invention is necessary if high capacity, high efficiency of oxygen absorption and relatively complete treatment are to be maintained. The oxygen absorption efficiency obtainable through proper spacing of rows of diffusers is enhanced by arranging the rows of diffusers so that the centerline of the band nearest a tank wall is spaced therefrom a distance equal to between approximately 70% and 200% of the effective width of the bands of aeration created by a row of diffusers and preferably approximately equal to the width of said band. In an aeration tank having the air introduction means arranged as set forth above, air discharged into the liquid medium rises as part of a liquid-air dispersion in a predominantly upward direction and induces circulation wherein movement of liquid and air between companion bands of aeration brings together sections of the flow from companion bands of aeration in an extended mixing zone. The continued introduction of air provides for continuous liquid and air flow within said bands of aeration and continued mixing in the zones between the bands of aeration whereby extended mixing zones or turbulent areas are created wherein gas bubbles are subjected to attrition or shearing action. The turbulent mixing creates large areas for intimate interfacial contact of gas and liquid where the flows attributable to companion portions of adjacent bands of aeration meet.

Best efficiency of oxygen absorption is obtained when the bands of aeration are distributed so as to provide for a reasonably unhindered flow, at least over a major portion of the upwardly directed flow of the liquid-gas dispersion. In the case of a band of aeration adjacent a wall, the distance between the perimeter of the band and the wall has a marked effect upon the efficiency of absorption effected in the peripheral zone of the tank and as a result an appreciable effect upon the overall efficiency of absorption in the tank. If the band of aeration is positioned directly against the wall, that portion of the band of aeration abutting the wall has its natural expansion prevented and it crowds the dispersion rising above that portion of the gas dispersion unit which is removed from the wall, hindering the flow. If the perimeter of the band of aeration is removed from the wall, a distance approximately one-half of the width of the band of aeration, an optimum condition for the necessary gas bubble shearing action is maintained.

Apparatus for intimately contacting multicomponent gas having a separable component and liquid mediums, in accordance with this invention, consists of a liquid medium confining zone or holder such as a tank or pond adapted for batch operation or adapted for continuous flow of liquid medium therethrough. The preferred tank construction is one providing for uniform cross-sectional configuration. Thus, a preferred construction is a square or a rectangular cross-sectional configuration tank free from liquid flow altering fillets, copings, or other obstructions. It is to be understood that tanks having overhanging copings, and the like, such as are installed in many of the aeration tanks for activated sludge systems, may be adapted to the new method of operation without removing the liquid flow obstructions, but the presence of the obstructions may make it difficult to attain as high an efficiency of oxygen absorption as is attained in an unobstructed tank.

Such a holder is provided with means for passing influent liquid medium into said holder and means for discharge of treated liquid from said holder. Within the holder is positioned gas dispersing means spaced from the bottom of said holder a distance constituting between about 10% and 20% of the distance between the bottom and the normal liquid level of said holder, said gas dispersing means consisting of a series of spaced units adapted to discharge gas in bubble form, said units being arranged in a multiplicity of substantially parallel spaced rows, the distance between peripheries of adjacent rows of gas dispersing means being between 40% and 150% of the sum of the effective widths of adjacent rows of gas dispersing means as measured in their projection against a plane positioned at a right angle to the direction of the rows of gas dispersing means and conduit means for conveying gas to said gas dispersing means.

Air is representative of multicomponent gas media having a separable component. It is to be understood that the meaning of separable component as used herein, is that the component may be removed from the multicomponent gas during passage through the aqueous medium either by absorption, by adsorption, or by chemical reaction.

Introduction of air or other multicomponent gas into the tank or liquid confining zone is accomplished by means of gas dispersal units positioned below the normal liquid level of the liquid therein. The gas dispersal units may be of the porous or non-porous type. The dispersing units are disposed in a multiplicity of spaced rows in an arrangement such that the rows of gas diffusers in their projection against a plane positioned at a right angle to the rows of diffusers have the centerline of a row formation of diffuser elements adjacent a holder wall spaced therefrom a distance not substantially less than the effective gas dispersing width of said row formation of diffuser elements and the distance between perimeter lines of adjacent row formations of diffuser elements is between about 40% and 100% of the sum of the effective gas dispersing widths of said adjacent row formations of diffuser elements. Gas is conveyed to the gas dispersing means from a source of compressed air by suitable conduit or header means. Such gas dispersal units may, for example, be "Saran" porous medium diffusers, spargers, disk-type diffusers, hydraulic shear diffusers, Venturi-type diffusers, and the like. The invention will be described, for simplification purposes, in detail with regard to the "Saran" porous medium diffusers unless otherwise specified.

The diffusers generally are supported by gas pipe headers spaced from the tank floor. The headers generally have a plurality of air supply pipes extending laterally therefrom with one end of the pipes communicating with the interior of the header and the other end of the pipes carrying diffuser tubes with porous walls to permit flow of gas therethrough.

When diffusers are arranged on a header in pairs to form a band of aeration having an effective width, determined by its projection against a plane positioned at a right angle to the header, of 2 feet, i.e., a distance between perimeter lines of the effective width of the diffusion band created by the pair of diffusers, three bands of aeration having approximately the minimum critical spacing may be positioned in a tank of 10 foot width. If the center line of the outer rows of diffusers is spaced a distance of 1.4 feet from the wall and the diffusion band is 2 feet wide, the center line is spaced a distance equal to 70% of the effective width of the band of aeration.

The spacing between perimeter lines of the gas discharging extremities of the diffusers will be 1.6 feet, a spacing which is equal to 40% of the total effective gas dispersing widths of the adjacent dispersers.

As was pointed out previously, it has been observed that a multiplicity of bands of aeration are set up by the three rows of dispersion units and that liquid flow currents are generated which intermingle with the flow currents generated by adjacent portions of companion bands of aeration giving rise to turbulence and gas bubble shearing action creative of an appreciable interfacial gas bubble-liquid contact. The high efficiency attained and maintained over a wide range of gas input is attributable to the interfacial gas bubble-liquid contact.

In the preferred arrangement of apparatus utilizing porous medium diffusers, companion gas discharge members are mounted on each side of a header to form disperser units. These members consist of "Saran" porous medium diffuser units of about 2 foot length. If the tank has a width of 26 feet, it is provided with three longitudinal rows of disperser units. Each unit has an effective gas dispersing width of approximately 4.66 feet, i.e., two units of two foot length longitudinally aligned with a 6 inch diameter header therebetween. The rows of disperser units adjacent the lateral walls, have the perimeter line of the unit spaced from the wall, a distance of 2 feet or the center line of the unit spaced from the wall 4.33 feet. With this spacing, the center line of a unit of 4.66 foot width, is removed from the wall a distance of about 93% of the effective width of the diffuser unit. Assuming this wall spacing, diffusion units of the same size and equal spacing of the center lines of units, the distance between perimeter lines of adjacent units will be 4.01 feet. This is a spacing equal to approximately 43% of the 9.32 foot sum of the effective widths of the adjacent rows of diffuser units.

It will be recognized that different types of diffusers may be used singly or in combination to provide bands of aeration differing in width from that of the porous diffusers described above, and that consequently the critical center line spacings of the diffusers may fall outside of the 7 to 12 foot range specified above for porous diffusers. As a general rule, for maximum oxygen absorption efficiency when utilizing diffuser units of the cylindrical porous type positioned horizontally, the distance between perimeter lines marking the outer limit of the diffusion bands at the level of gas introduction is equal to the width of the band of aeration.

This relationship can be expressed in another way. If the oxygen absorption efficiency is to be maintained high, the width of the space between companion bands of aeration should be approximately equal to the sum of one-half of the span of each of said companion bands of aeration. If the distance between the companion bands of aeration is appreciably less than or greater than approximately one-half of the sum of the spans of said companion bands of aeration, the oxygen absorption efficiency is adversely affected.

The difference in efficiency of oxygen absorption due to operation of a tank using the "spiral flow" method and operation of the same tank in accordance with the method of aeration of this invention is clearly shown by the following comparison.

In a section of a tank whose cross-sectional dimensions are 24 feet width and 15 feet height, if the diffusers consist of 6 "Saran" porous media diffusers horizontally positioned and evenly spaced along a header position about 2 feet from the bottom of the tank and 3 feet from the side wall, the efficiency of $O_2$ absorption at air inputs of 12½ c.f.m. per foot of tank length is about 10% and at 20 c.f.m per foot of tank length is about 9%. If, on the other hand, three rows of diffusers are arranged in parallel with 6 "Saran" diffusers on both sides of each header as described previously, to provide three parallel bands of aeration of approximately 4½ foot width, the efficiency of oxygen absorption at 12½ c.f.m. per foot tank length is about 18% and at 20 c.f.m. is about 16%, i.e., nearly double that attained with the spiral flow mode of operation; and even at 90 c.f.m. per foot of tank length, the oxygen absorption efficiency remains high at about 15%.

For the purposes of determining the relationship of the total width of the bands of aeration to the lateral dimension of a tank, an elevational view is taken in the direction of the rows of diffusers and the effective width of each band of aeration adjacent the zone of introduction of gas is projected on the wall through which the view is taken. The total of the widths of the aeration bands showing on the wall is divided by the length of the lateral dimension of the wall to determine whether total width spanned by the bands of aeration falls within the critical limits.

The advantages of operating in accordance with this invention are not limited to arrangements where the diffusers are symmetrically positioned in plan view. Individual diffusers or groups of diffusers may be staggered laterally in plan view, but so long as the rows of diffusers give rise to reasonably parallel bands of aeration, the advantage of the system will be realized.

The advantages of operating in accordance with this invention are not limited to arrangements utilizing porous media diffusers providing bands of aeration, for example, of 4 foot width, i.e., cylindrical diffuser elements capable of discharging gas in small bubble form. When spargers, which can be discussed as representative of coarse bubble diffusers, are mounted in a "spiral flow" tank, diffuser efficiencies of the order of 6% are obtained. When spargers are mounted in accordance with this invention, diffuser efficiency of about 10% to 12% is attained, i.e., nearly double that obtained when utilizing a single row of diffusers.

Spargers can be arranged to provide a multiplicity of widths for bands of aeration. If spargers are mounted in pairs on opposite sides of the header to provide a band of aeration of 16 inches in width, a minimum of four bands of aeration is required to maintain high oxygen absorption efficiency in a tank of 15 foot width; a minimum of 6 bands of aeration is required in a tank of 22 foot width; a minimum of 8 bands is required in a tank of 30 foot width.

In general, determination of whether the diffuser arrangement meets the requirements of this invention, may be made by projecting a segment of a tank on a vertical plane, said segment being taken in the plane of the diffuser elements, assuming that the diffuser elements are in one plane, or by projecting a wider segment of the tank so as to encompass the various planes of the diffuser elements if the diffuser elements lie in more than one horizontal plane, and at right angles to the row formation of the diffuser elements. The number of diffuser elements appearing in the plane, the effective gas dispersing width of the various diffusers and the space between elements may be measured to calculate the spacial relationship.

The above discussion deals only with the spacing of the diffusers in a lateral direction. Highest efficiencies of $O_2$ absorption are attained when the gas introducing means are positioned so as, in plan view, to create a symmetrical pattern extending over a major portion of the length of an aeration tank. However, a high order of oxygen absorption efficiency is obtained if, for example, the first 25% of the length of a tank has the diffusers arranged in accordance with this invention and the balance of the length of the tank is adapted for conventional "spiral flow" operation.

Gas introduction apparatus may have many different arrangements and still provide a multiplicity of parallel bands of aeration. Headers may run laterally in a tank and still provide parallel bands of diffusion. Nor is an individual header required for each longitudinally extending row of diffusion units. A header may be branched so as to provide support for two or more rows of diffusion units.

Gas is fed to the diffusers at pressures sufficient to overcome the hydrostatic head. The volume of gas discharged into a tank will naturally depend upon the process requirements.

This aeration system is particularly adapted to operation at high rates of gas introduction per minute per foot of tank length. When operated in accordance with this invention, high oxygen transfer efficiency is attained at gas throughput rates of, for example, 30 c.f.m. per foot of tank length and higher. Comparable oxygen transfer efficiencies were not attainable heretofore at such high rates of gas introduction. The system of this invention is unique in that the oxygen transfer efficiency shows only a slight reduction over the range of gas throughputs between about 30 c.f.m. and 150 c.f.m. per foot of tank length.

The capabilities and advantages of the invention will be apparent to those skilled in the art from the following description of a preferred embodiment thereof taken in conjunction with the accompanying drawings in which.

Figure 1:
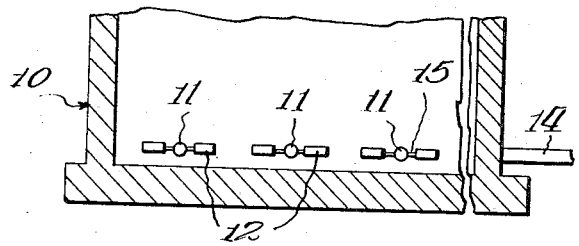
FIGURE 1 is a cross-sectional view of a tank with gas dispersal units symmetrically positioned therein.
Figure 2:
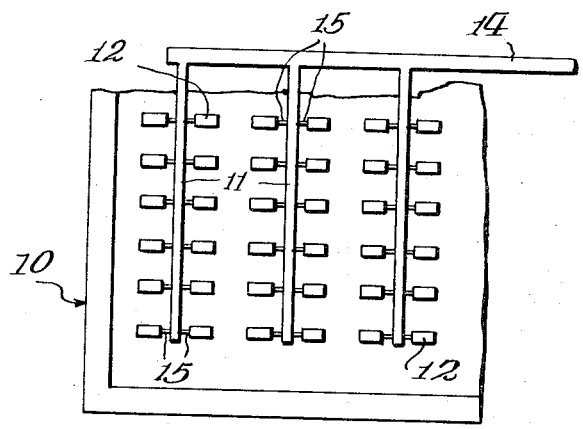
FIG. 2 is a top plan view of the tank and dispersal units shown in FIGURE 1.

Referring to FIGURES 1 and 2, the numeral 10 indicates a tank of, for example, 26 foot lateral dimension or width which may be constructed of any suitable material such as concrete, steel, and the like. Mounted within the tank 10 are headers 11. Headers 11 are spaced from the floor of the tank. Each header 11 is provided with spaced companion pairs of gas diffuser units 12, illustrated as cylindrical diffusers having a length of about 2 feet each connected to the header through suitable suitable support conduit 15. Gas diffuser units 12 extend transversely of the tank in three longitudinally extending parallel bands. Headers 11 are connected to a source of air under pressure (not shown) by a conduit 14.

Figure 3:
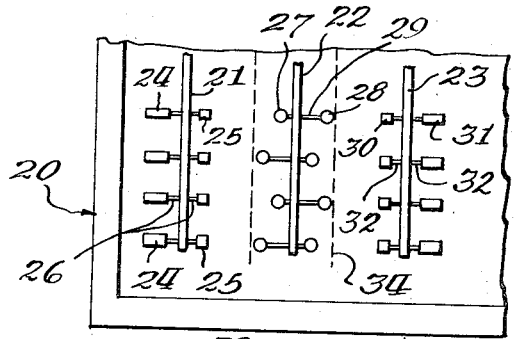
FIG. 3 is a top plan view of a tank utilizing two different types of dispersers to create the bands of aeration.

Referring to FIG. 3, the numeral 20 indicates a tank similar to that shown in FIGS. 1 and 2. Mounted within the tank 20 are headers 21, 22 and 23 adapted to conduct air to diffusers. Header 21 is provided with spaced cylindrical diffuser units 24 and 25 of different length connected to the header through suitable conduit 26. Header 22 is provided with sparger elements 27 and 28 connected to the header through suitable conduit means 29. Header 23 is provided with spaced cylindrical diffuser units 30 and 31 connected to the header by suitable conduit means 32. In this figure, the dash lines 33 and 34 indicate the extremities of the band of aeration created by the diffusers 27 and 28 about the header 22. It will be observed that the diffusers shown in this figure do not provide a symmetrical diffuser positioning pattern.

Figure 4:
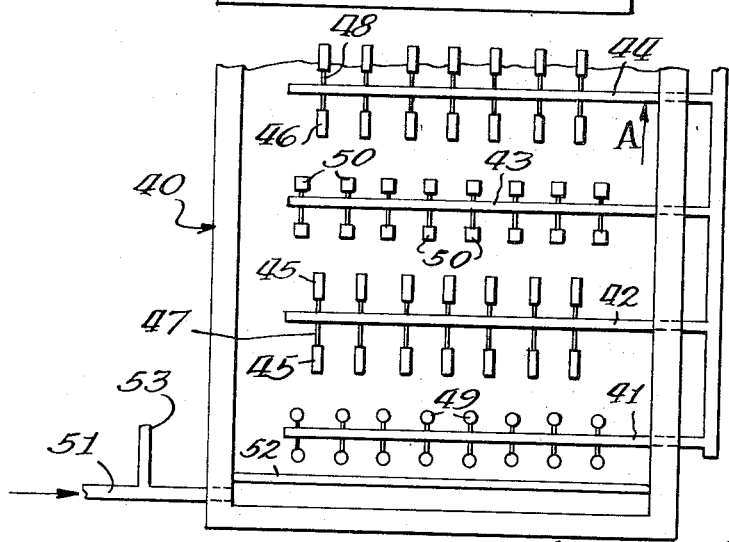
FIG. 4 is a top plan view of a tank having the bands of aeration positioned transverse to the direction of liquid flow through the tank.

Referring to FIG. 4, the numeral 40 indicates a tank similar to that shown in FIGS. 1 and 2. Mounted within the tank 40 are headers 41, 42, 43 and 44, positioned transverse to the direction of flow of the liquid, indicated by the arrow A. Headers 42 and 44 are provided with spaced diffuser elements 45 and 46, respectively, connected to the header by suitable conduit means 47 and 48, respectively.

Diffuser elements of three types are shown to illustrate that different types of elements may be effective in a single tank. Header 41 is provided with diffuser elements 49 illustrated as round elements in plan view indicative of the sparger type. Header 43 is provided with diffuser elements 50 illustrated as symmetrical elements in plan view, i.e., illustrated as square elements in plan view representative of "shear box" diffusers wherein gas is introduced into the bottom of a square tubular element closed on the sides and bottom and open at the top to permit flow of liquid from the tank into the tubular element countercurrent to a rising column of liquid and bubbles of gas.

Raw sewage enters the tank 40 through a sewage conduit 51 connecting with an inlet control weir 52. Recycle activated sludge from a source, not shown, is introduced into conduit 51 through a pipe 53.

While the invention has been described with reference to various apparatus arrangements, other arrangements will be readily suggested to those skilled in the art.

The above described apparatus may be effectively and efficiently utilized in the treatment of sewage. Raw sewage as it reaches a treatment plant contains floating and suspended material. In a modern sewage disposal plant, the sewage may flow through a grit chamber and comminutor and then through a primary settling tank. Primary effluent or raw sewage may be subjected to aeration treatment in equipment described with relation to FIGURES 1–4 as a substitute for conventional apparatus. Primary effluent or raw sewage is mixed with recycled activated sludge and fed to the aeration tank. Solids contents of the mixture may vary considerably but generally held to within the range between about 600 and 4000 p.p.m. Air is supplied from positive displacement or centrifugal blowers. The air is delivered to the multiplicity of gas dispersal units in quantities to supply generally between about 10 and 100 cubic feet of air per minute per foot of tank length. The gas dispersal units are positioned, for example, 10 to 15 feet below the surface of the liquid in the tank filled to a depth of 15 feet. Primary effluent treated in such a tank is detained in the aeration tank in accordance with usual practice depending upon the strength of the sewage.

When utilizing, for example, an apparatus arrangement such as is disclosed in FIGS. 1 and 2, the B.O.D. loading of the tank may be increased in direct proportion to the increase in efficiency of the oxygen absorption attainable as compared to the oxygen absorption efficiency obtainable if the tank is operated in accordance with the spiral flow principle. Expressed another way, the size of the tank may be reduced or the time of treatment may be reduced in an amount directly proportional to the increase in efficiency obtained by the use of the herein described method of operation.

Although the invention has been described in connection with specific embodiments thereof, it will be understood that these are not to be regarded as limitations upon the scope of the invention except insofar as included in the accompanying claims.

What is claimed is:

1. Apparatus for dispersing gas in a liquid medium which comprises a holder for a liquid medium having lateral boundaries and a bottom, means for passing influent liquid medium into said holder, means for discharge of treated liquid from said holder, gas dispersing means spaced from the bottom of said holder a distance constituting between about 10% and 20% of the distance between the bottom and the normal liquid level of said holder, said gas dispersing means consisting of a series of spaced units adapted to discharge gas in bubble form, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

2. Apparatus for dispersing gas in a liquid medium which comprises a holder for a liquid medium having lateral boundaries and a bottom, means for passing influent liquid medium into said holder, means for discharge of treated liquid from said holder, said gas dispersing means consisting of a series of spaced units adapted to discharge gas in bubble form supported in suspended position by gas pipe headers running longitudinally in said holder, said gas dispersing means consisting of a series of spaced units adapted to discharge gas in bubble form, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

3. Apparatus for dispersing gas in a liquid medium which comprises a holder for a liquid medium having lateral boundaries and a bottom, means for passing influent liquid medium into said holder, means for discharge of treated liquid from said holder, said gas dispersing means consisting of a series of spaced units adapted to discharge gas in bubble form supported in suspended position by gas pipe headers running transverse to the direction of liquid flow in said holder, said gas dispersing means consisting of a series of spaced units adapted to discharge gas in bubble form, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

4. Apparatus for dispersing gas in a liquid medium whereby a component of the gaseous material is preferentially absorbed by the liquid which comprises a holder for a liquid medium having lateral boundaries and a bottom, means for passing influent liquid medium into said holder, means for discharge of treated liquid from said holder, gas dispersing means spaced from the bottom of said holder a distance constituting between about 10% and 20% of the distance between the bottom and the normal liquid level of said holder, said gas dispersing means consisting of a series of spaced units adapted to discharge gas in bubble form, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

5. Apparatus for dispersing gas in a liquid medium which comprises a holder for a liquid medium having lateral boundaries and a bottom, means for passing influent liquid medium into said holder, means for discharge of treated liquid from said holder, gas pipe headers spaced from the bottom of said holder a distance constituting between about 10% and 20% of the distance between the bottom and the normal liquid level of said holder, a plurality of air supply pipes having one end connecting to said headers and extending laterally therefrom, a plurality of diffuser tubes with porous walls to permit flow of gas therethrough supported from the outer end of said air supply pipes, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

6. Apparatus for dispersing gas in a liquid medium which comprises a holder for a liquid medium having lateral boundaries and a bottom, means for passing influent liquid medium into said holder, means for discharge of treated liquid from said holder, gas pipe headers spaced from the bottom of said holder a distance constituting between about 10% and 20% of the distance between the bottom and the normal liquid level of said holder, a plurality of air supply pipes having one end connecting to said headers and extending laterally therefrom, a plurality of diffuser tubes with porous walls to permit dispersion of air in fine bubble form in liquid medium in said holder, said gas dispersing means consisting of a series of spaced units adapted to discharge gas in bubble form, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

7. Apparatus for aerating aqueous sewage which comprises a holder for a liquid medium having lateral boundaries and a bottom, means for passing influent liquid medium into said holder, means for discharge of treated liquid from said holder, gas dispersing means spaced from the bottom of said holder a distance constituting between about 10% and 20% of the distance between the bottom and the normal liquid level of said holder, said gas dispersing means consisting of a series of spaced units adapted to discharge gas in bubble form, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

8. Apparatus for dispersing gas in a liquid medium which comprises a holder for a liquid medium having lateral boundaries and a bottom, means for passing influent liquid medium into said holder, means for discharge of treated liquid from said holder, gas dispersing means spaced from the bottom of said holder a distance constituting between about 10% and 20% of the distance between the bottom and the normal liquid level of said holder, said gas dispersing means consisting of a series of spaced units adapted to discharge gas in bubble form, said units being arranged in a multiplicity of substantially parallel spaced rows, having the centerline of a row formation positioned adjacent a parallel running wall spaced therefrom a distance equal to between 70% and 200% of the effective width of said row of gas dispersing means and said effective widths being measured in their projection against a plane positioned at a right angle to the direction of the rows of gas dispersing means and conduit means for conveying gas to said gas dispersing means.

9. Apparatus for dispersing gas in a liquid medium which comprises a holder for a liquid medium having lateral boundaries and a bottom, means for passing influent liquid medium into said holder, means for discharge of treated liquid from said holder, gas dispersing means spaced from the bottom of said holder a distance constituting between about 10% and 20% of the distance between the bottom and the normal liquid level of said holder, said gas dispersing means consisting of a series of spaced units adapted to discharge gas in volumes in the range between 30 c.f.m. and 150 c.f.m. per foot of holder length, said units being arranged in a multiplicity of substantially parallel spaced rows, the distance between peripheries of adjacent rows of gas dispersing means being between 40% and 150% of the sum of the effective widths of adjacent rows of gas dispersing means being measured in their projection against a plane positioned at a right angle to the direction of the rows of gas dispersing means and conduit means for conveying gas to said gas dispersing means.

References Cited

Metcalf et al., American Sewage Practice, Vol. III, Disposal of Sewage, Third Edit., 1935, McGraw-Hill, N.Y. pp. 631–666.

Nordell, Milwaukee Air-Diffusion Studies in Activated Sludge, Engineering News-Record, Vol. 78, No. 13, June 28, 1917, pp. 628–629.

Babbitt, Sewerage and Sewage Treatment, Sixth Edit., 1947, Wiley & Sons, N.Y., pp. 467–470.

JOSEPH SCOVRONEK, *Primary Examiner.*

M. E. ROGERS, *Assistant Examiner.*